Aug. 20, 1963  F. CLIFFORD ET AL  3,101,208
COUPLING WITH PLURAL LUG IN SLOT HOLDING MEANS
AND EXTERNAL SEALING SHELL
Filed Dec. 7, 1959
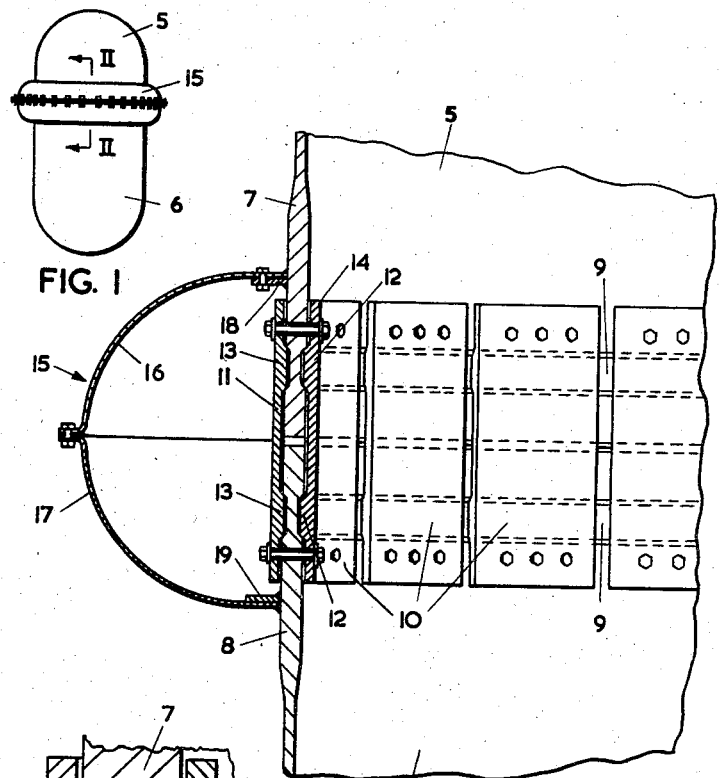
FIG. 1
FIG. 2
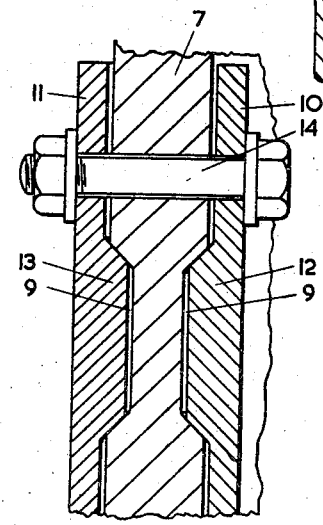
FIG. 3
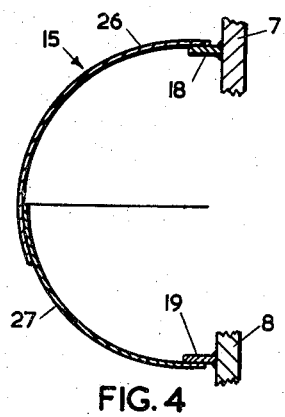
FIG. 4
INVENTORS
Frank Clifford
C. M. White
By *Holcomb, Wetherill & Hulslin*
ATTORNEYS

United States Patent Office 3,101,208
Patented Aug. 20, 1963

3,101,208
COUPLING WITH PLURAL LUG IN SLOT HOLDING MEANS AND EXTERNAL SEALING SHELL
Frank Clifford and Charles Milburn White, Darlington, England, assignors to Whessoe Limited, Darlington, England
Filed Dec. 7, 1959, Ser. No. 857,728
6 Claims. (Cl. 285—363)

Pressure vessels having a removable end, or otherwise constructed in two separable parts, ordinarily have the meeting edges of the parts provided with outwardly projecting flanges, which are bolted together face to face with the interposition of a sealing gasket. With very large pressure vessels, or vessels subjected to high operating pressures, adequately strong flanges of this character can be provided only by the use of excessively heavy scantlings. Moreover, it is difficult to obtain a sufficiently tight seal to confine leakage to the very small degrees tolerable in apparatus used for certain purposes, such as nuclear reactor engineering, or apparatus for handling noxious gases.

In an attempt to meet the latter difficulty, the flanges are sometimes provided with small lips which are welded to make a pressure tight seal between the parts. While satisfactory initial sealing can probably be obtained in this way, the strain on the bolts over long periods tends to cause cracking of the sealing welds owing to the rigidity of the small welding lips, and of course the use of this expedient does nothing to reduce the weight of the scantlings required for the flanges.

The present invention provides a form of joint for the above purpose which reduces the scantlings required to reasonable proportions, the two parts of the vessel being secured together by a mechanical connection which resists forces tending to separate them but is not itself fluid tight and this mechanical joint being enclosed by a fluid tight membrane or sealing shell of generally toroidal form, which can be made of relatively light and flexible material.

The accompanying drawing shows by way of example a pressure vessel having an end part removably connected to the remaining part of the vessel by one form of joint in accordance with the invention. In this drawing:

FIGURE 1 shows the complete vessel in elevation;
FIGURE 2 shows on a larger scale a fragmentary section taken on the line II—II of FIGURE 1;
FIGURE 3 shows a part of FIGURE 2 on a still larger scale; and
FIGURE 4 shows a view, corresponding to FIGURE 2, of a modification.

Referring first to FIGURES 1 to 3, the pressure vessel illustrated has the form of a vertically disposed cylinder with hemispherical ends. The entire upper end part 5 of the vessel is separable from the remaining part or body 6 of the vessel, the circular horizontal joint between them lying in the cylindrical part of the vessel wall.

The upper margin of the cylindrical wall of the body 6 is made of greater thickness than the main portion of that wall, as shown at 8, and the lower margin of the removable end part 5 is similarly formed as a thickened ring 7, aligned with but spaced slightly apart from the thickened ring 8 of the body. A groove or slot 9 is machined into the inner and the outer face of each of these thickened rings, the four slots extending completely around the periphery of the vessel, close to the adjacent edges of the rings 7, 8. Distributed along the length of these annular slots is a large number of pairs of cleats, one cleat 10 of each pair being inside the vessel while the other cleat 11 of the pair is outside, the number and circumferential length of the cleats being such that they cover substantially the whole periphery, leaving narrow gaps between the ends of adjacent cleats. Each interior cleat 10 has on its outer face two longitudinal ribs 12 and each exterior cleat 11 has on its inner face two similar ribs 13. The cleats of each pair are drawn together by bolts 14 passed through clearance holes in the thickened rings 7, 8 so that their ribs engage in the slots in the rings and prevent the two rings from moving apart. The slots and the co-operating ribs on the cleats taper in width at an angle less than the friction angle, so that once the bolts have been tightened no additional load will be imposed on the bolts by forces tending to separate the rings.

Around the outside of the vessel, there is placed a toroidal sealing shell 15 of semi-circular cross section whose edges are sealed to the outer faces of the two thickened rings, so that the shell completely encloses the external cleats 11 of the mechanical or strength joint described above. This shell 15 is formed in two parts 16, 17 each of quarter circular cross section, and the inner edge of the lower part 17 is permanently welded to a flange 19 provided on the outer face of the thickened ring 8 of the vessel body. The inner edge of the upper part 16 is secured by bolts to a similar flange 18 on the thickened ring 7 of the removable end part of the vessel. The outer edges of the two parts 16, 17 are externally flanged and bolted together, so that the upper part of the shell can be removed when necessary to give access to the cleat holding bolts 14 and allow removal of the end part 5 of the vessel.

The interior of the sealing shell 15 communicates through the gaps left between the rings 7, 8 and between adjacent pairs of cleats with the interior of the vessel, so that the sealing shell is subjected to internal fluid pressure. Owing to the fact that the secondary radius of curvature of the sealing shell is small relative to that of the cylindrical pressure vessel, it can be given the strength required to withstand this pressure by constructing it from relatively very light scantlings. The lightness of the scantlings gives the shell the character of a sealing membrane having sufficient flexibility to accommodate, without impairing the tightness of the seal, any movement due to long term strain of the mechanical or strength joint formed by the cleats 10, 11 and the grooved rings 7, 8.

Since the pressures inside and outside the strength joint are equal, this joint is not subjected to hoop tension and it serves only to transmit longitudinal forces, which for a cylindrical pressure vessel are only half the magnitude of the hoop forces. This more than compensates for the fact that stress concentrations occur at the roots of the slots 9 and helps to keep down the size of the scantlings required for the thickened rings 7, 8. Longitudinal forces are transmitted across the joint through the internal and external cleats 10 and 11 equally, so that no large bending moments (such as are produced when conventional flanges are employed) have to be withstood by the thickened rings. Bending stresses are set up at the points where the toroidal shell or sealing membrane 15 is connected to the rings 7, 8 but these are quite small and the increased thickness of the rings necessary for the formation of the strength joint is amply sufficient to accommodate these bending stresses also.

The joint structure illustrated in FIGURES 1 to 3 of the drawings constitutes only one example of a joint in accordance with the invention and can be modified in many ways, of which those mentioned below are examples only. When removal of the part 5 of the vessel is only very infrequently necessary, all the joints of the toroidal sealing shell 15 may be made by welding, as shown in FIGURE 4. In the construction there shown, each of the two parts 26, 27 of the shell has its inner edge welded of the corresponding flange 18, 19 and the outer edges of the parts are overlapped and welded together. Each of the two parts of the sealing shell may be constituted by a single ring-shaped member, or by a plurality of sections sealed together end to end to form a ring. The sealing shell is not necessarily toroidal in the strict sense of having the form of a surface of revolution: it could, for example comprise a plurality of straight, cylindrically curved portions disposed end to end to form an externally polygonal ring, the inner edges being shaped to fit the vessel. The recesses for engagement by the cleats are not necessarily in the form of continuous annular grooves, as shown at 9: for example, the recesses in the outer faces of the parts could be formed by a series of straight, chordal slots. The bolts 14 illustrated may be replaced by equivalent tie members, such as studs or tap bolts.

While the invention has been described above in its application to vessels required to withstand high internal pressures, it is applicable also to vessels required to withstand external pressures, including vessels subjected externally to atmospheric pressure and to reduced internal pressure. The term pressure vessel as used in the appended claims is to be understood as including all such vessels.

The invention is not limited to vessels of cylindrical form, nor to vessels including a cylindrical portion in which the joint between the two separable parts is made. It may be applied, for example, to a spherical vessel with a joint situated at or near the equator of the vessel, or to a conical or frusto-conical vessel with a joint situated in the conical part of the vessel wall or situated between the end of the conical part and a removable end member having the form of a surface of revolution about the axis of the cone. Nor is the invention limited as to the relative size of the two separable parts of the vessel which are connected by the joint. For example, in the case of a vessel having a relatively small branch or protrusion of cylindrical form, a joint in accordance with the invention may be formed between the open end of that branch and a removable cover having the form of a hemisphere or other surface of revolution about the axis of the branch. A single pressure vessel may, of course, include more than one joint in accordance with the invention, the vessel comprising three or more separable parts.

What is claimed is:

1. A pressure vessel comprising two separable parts having aligned walls which define a pair of registering mouths, the wall of each part of the vessel including adjacent its mouth a thickened portion having recesses formed in its internal and external surfaces, the thickness of said wall at the bottoms of said recesses remaining substantially equal to that of those portions of said wall beyond said thickened portion, the recesses in the two portions being positioned opposite each other and extending in a generally circumferential direction, a plurality of pairs of cleats, the cleats of each pair being disposed one inside and the other outside the vessel, each cleat being formed with two projections engaging respectively in said recesses in the two parts of the vessel, a plurality of tie members which pass with clearance through the vessel walls and draw the pairs of cleats together, said cleats and tie members securing the walls of said two parts together against forces acting in a direction perpendicular to the plane of the mouths and forming a joint between the two parts of said vessel, said joint being so fluid pervious as to be subject to the same pressure on both inside and out, and a fluid tight sealing shell made of relatively thin flexible material which extends across and seals said joint, said sealing shell having its concave face toward the vessel wall and its opposite edges sealed fluid tight to said vessel parts along lines lying on opposite sides of said joint, the maximum transverse dimension of said sealing shell being substantially smaller than that of said mouths.

2. A pressure vessel in accordance with claim 1 wherein the interengaging projections and recesses of the cleats and vessel walls taper in width at an angle less than the friction angle, whereby the imposition of a force tending to separate the vessel parts imposed no additional stress on the tie members holding the cleats in engagement with the vessel walls.

3. A pressure vessel in accordance with claim 1 wherein the fluid tight sealing shell comprises two ring-shaped parts, each sealed along one edge to one part of the vessel and having their other edges sealed together.

4. A pressure vessel in accordance with claim 3 wherein at least one of the said parts of the sealing shell has its first mentioned edge welded to the wall of the vessel.

5. A pressure vessel in accordance with claim 3 wherein at least one of the said parts of the sealing shell has its first mentioned edge bolted to a flange projecting from the wall of the vessel.

6. A pressure vessel in accordance with claim 3 wherein at least one of the said two parts of the sealing shell comprises a plurality of sections sealed together end to end to form a ring.

References Cited in the file of this patent

UNITED STATES PATENTS

| | | |
|---|---|---|
| 333,413 | Hoeveler | Dec. 29, 1885 |
| 1,073,614 | McDearmid | Sept. 23, 1913 |
| 1,081,963 | Holloway | Dec. 23, 1913 |
| 2,169,092 | Doran | Aug. 8, 1939 |
| 3,044,657 | Horton | July 17, 1962 |

FOREIGN PATENTS

| | | |
|---|---|---|
| 95,294 | Germany | May 12, 1897 |
| 156,184 | Switzerland | Oct. 1, 1932 |